United States Patent Office 2,968,257
Patented Jan. 17, 1961

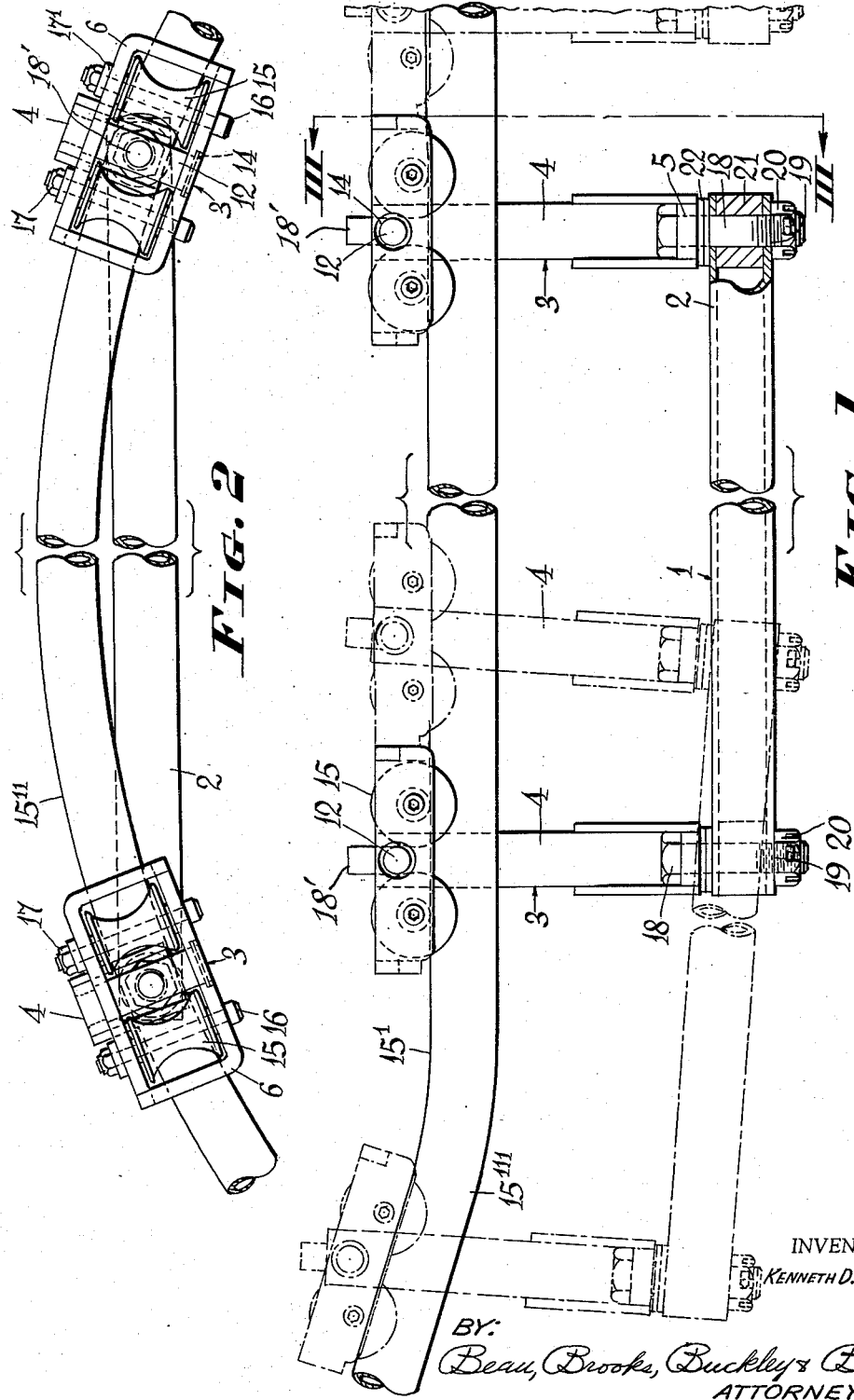

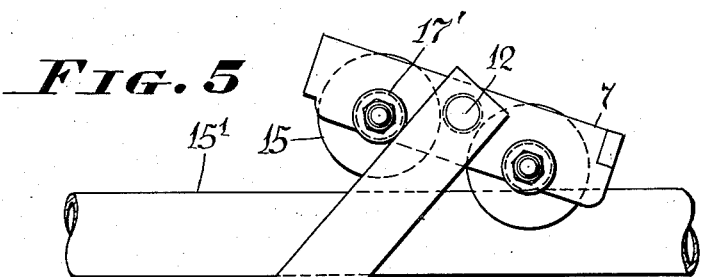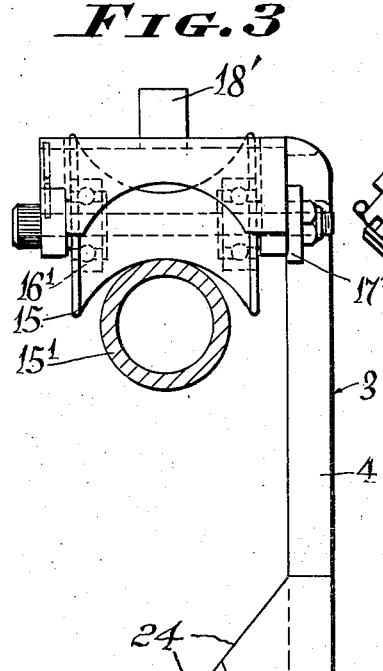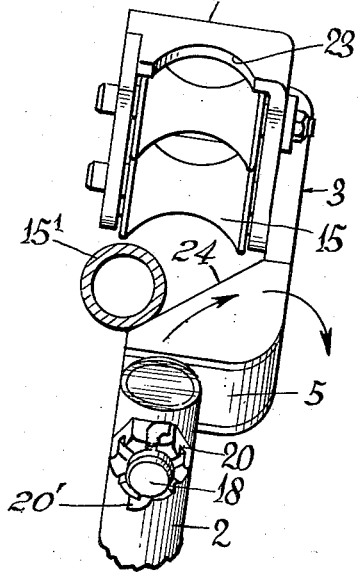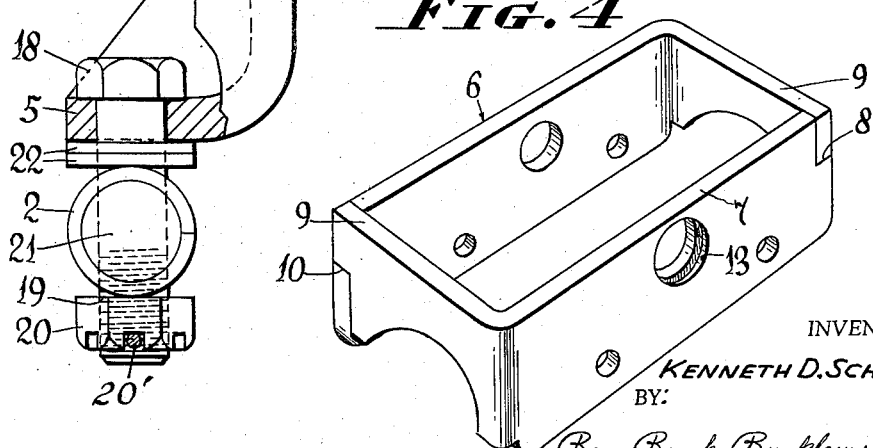
INVENTOR:
KENNETH D. SCHREYER
BY:
Beau, Brooke, Buckley & Beau,
ATTORNEYS.

2,968,257
CONVEYOR TROLLEY

Kenneth D. Schreyer, Snyder, N.Y., assignor to Columbus McKinnon Chain Corporation, Tonawanda, N.Y.

Filed Jan. 11, 1957, Ser. No. 633,643

2 Claims. (Cl. 105—150)

This invention relates generally to the conveyor art, and more specifically to a new and useful trolley construction for light conveyors such as are used for conveying garments on hangers.

Prior art trolleys of the type here under consideration are particularly deficient because in the event of derailment which is apt to occur especially under manual operation, they tend to remain partially derailed with resulting damage to the trolley.

Accordingly, it is a primary object of this invention to provide a light conveyor double head trolley construction less apt to derail than prior art types and having means which, upon derailment of either head, insure complete derailment thereby preventing damage to the trolley.

Another object of this invention is to provide such a trolley adapted for both manuel and power installations.

Still another object of this invention is to provide a trolley having the aforsaid characteristics which is extremely durable and dependable in operation while being of a relatively simple construction readily fabricated and assembled using relatively inexpensive materials.

A conveyor trolley constructed in accord with my invention is characterized in one aspect thereof by a carriage, an arm normally depending therefrom, pivot means connecting the carriage to the arm adjacent the upper end thereof for pivoting relative thereto, the arm being adapted adjacent its lower end for attachment to a load member, and a pair of spool shaped wheels journaled in the carriage on opposite sides of the pivot axis for engaging a conveyor rail.

Another aspect thereof, a conveyor trolley constructed in accord with my invention is characterized by the provision of a carriage, an arm depending therefrom for attachment to a load member, a pivot means connecting the carriage to the arm for pivoting relative thereto, wheel means journaled to the carriage for engaging a conveyor rail, and derailment means including stop means carried by the carriage on opposite sides of the arm for engaging the latter to limit pivoting between the carriage and the arm.

In still another aspect thereof, a conveyor trolley constructed in accord with my invention is characterized by the provision of a carriage, wheel means journaled in the carriage for engaging a conveyor rail, an arm normally depending from the carriage and having a part extending inwardly therefrom beneath the carriage for attachment to a load member, and derailment means including gusset plate means extending across the juncture between the arm and its inwardly extending part, the gusset plate means having an inclined upper surface adapted to bear against an associated conveyor rail and cam the trolley away therefrom upon predetermined upward movement of the arm relative to such rail.

The foregoing and other objects, advantages and characterizing features of a conveyor trolley constructed in accord with my invention will become clearly apparent from the ensuing detailed description of a presently preferred embodiment thereof, taken in conjunction with the accompanying drawings illustrating such embodiment wherein like reference numerals denote like parts throughout the various views and wherein:

Fig. 1 is a side elevational view, partly in section, of an installation using a double head trolley of this invention, parts being broken away for ease of illustration;

Fig. 2 is a top plan view showing the trolley in operation on a curved rail, parts being broken away for ease of illustration;

Fig. 3 is an end elevational view, partly in section, taken about on line III—III of Fig. 1;

Fig. 4 is a perspective view of the frame comprising the trolley carriage;

Fig. 5 is a fragmentary side elevational view illustrating the initial derailing action on the trailing head; and Fig. 6 is a fragmentary end elevational view illustrating the final derailing action on the trailing head.

Referring now to the accompanying drawings, the trolley, generally designated 1, comprises a load bar 2, adapted to receive thereon garment hanger hooks and the like and which can be of tubular form, pivotally attached adjacent its opposite ends to trolley assemblies generally designated 3. Each trolley assembly is constructed in accord with the invention, and inasmuch as they are identical in every respect only one thereof will be described in detail hereafter.

Each trolley assembly comprises a normally vertically upright arm 4 of generally L-shape in side elevation, each arm 4 having a relatively short, generally horizontal leg 5 adapted for pivotal attachment to load bar 2 in a manner to be described.

The upper end portion of each arm 4 is pivotally connected to a carriage comprising a frame formed of two interlocking, matched members 6 (Fig. 4) of generally L-shape in plan view. Members 6 are identical and interlock when assembled in opposed relation, each having a relatively long leg portion 7 terminating in a forwardly projecting tab providing a shoulder 8 and a relatively short leg portion 9 having its outer end undercut to provide a shoulder 10. A pivot pin 12 is secured to the upper end portion of each arm 4, as by welding, and extends between and is journaled in the long leg portions 7 of members 6 with the forward leg portions 7 of each carriage being countersunk, as indicated at 13, to accommodate in recessed relation therein a snap ring 14 engaged in a circumferential groove in the outer end of each pin 12.

Each carriage frame carries a pair of spools 15 of identical construction each being of generally hour glass configuration to receive a tubular track such as the illustrated pipe rail 15'. The rail engaging part of each spool 15 is formed on a radius substantially greater than that of pipe rail 15'.

In assembly, the frame members 6 are slipped onto pivot pin 12 out of alinement and snap ring 14 is fitted in place. Then members 6 are interlocked with the undercut shouldered portions 10 bearing against the shouldered portions 8, and the spools 15 are put in. Spools 15 are held in place as by cap screws 16 extending therethrough and through the frame member leg portions 7, being journaled on ball bearings 16' in a manner known in the art and per se forming no part of the invention, and screws 16 and nuts 17 also serve to releasably lock the carriage in assembled relation on its pivot pin 12.

Thus, each trolley carriage has dual spools 15 adapted to ride along a pipe rail or the like, with the arm 4 depending therebelow.

Arm portion 5 is pivotally secured to the load bar 2 as by a screw bolt 18 having a shouldered outer end 19 to which a nut 20 is secured, the latter being releasably locked in position as by a pin 20'. Bolt 18 extends through load bar 2 and through bushing 21 therein, with a pair of washers 22 fitted between load bar 2 and arm portion 5, whereby each arm 4 is pivotally connected to load bar 2 for rotation relative thereto about the axes of bolts 18.

Thus, each load bar 2 is connected adjacent its opposite ends to a trolley having a dual spool type head, with the trolley arm 4 being rotatable relative to the load bar 2 about the normally vertical axis of bolt 18 and rotatable relative to its associated spool carriage about the normally horizontal axis of pin 12, thereby enabling the trolleys to swivel laterally relative to each other to accommodate laterally directed rail portions as indicated at 15″ in Fig. 2, and enabling the trolley carriages to swivel upwardly and downwardly relative to each other and to arms 4 to accommodate inclined rail portions such as shown at 15‴ (Fig. 1) as illustrated by the broken line showing in the left hand portion of Fig. 1.

It will be noted that the relatively short leg portions 9 of carriage frame members 6 are formed to provide a flat surface, at the opposite ends of the carriage, adapted to abut the corresponding frame member leg portion of an adjacent trolley carriage, as illustrated at the right hand side of Fig. 1, as when manually pushing a series of conveyors. The bumper thus provided enables the smooth transfer of power from the conveyor directly pushed to the conveyors stacked thereahead, in axial alinement therewith and with rail 15′ and in a manner such as to avoid dislodging the conveyors.

Also, the frame member leg portions 9 are generally semicircularly recessed on their bottom edges, as indicated at 23, to clear switches and the like in the conveyor rail 15′. To this end, recesses 23 preferably extend to an elevation normally substantially above that of the center undersurface of spools 15.

A particularly advantageous feature of a conveyor trolley constructed in accord with my invention resides in the means provided to ensure complete derailment, in a manner precluding injurious stressing thereof, in the event of derailment of either trolley.

Thus, with conventional double head trolleys whenever either head becomes derailed, which occurs most often to the leading head, relative to the direction of conveyor movement, when manually pushing the conveyor, the other head locks to the track and is stressed by the load bar 2. This occurs because the rail 15′ becomes locked in the angle between the main body part of arm 4 and portion 5 thereof, and the load carried by the conveyor load bar 2, which latter provides a lever action, stresses and strains the locked trolley head with resulting damage thereto.

The trolley of this invention is less likely to derail, because of the two spools provided each head, but if derailment cannot be avoided means are provided to preclude the aforesaid locking and ensure complete derailment.

To this end, cap screws 16, which hold together frame members 6 and mount spools 15 thereon, are provided with stop means in the form of washers 17′ in lateral alinement with arm 4. These stops limit the pivoting of the carriage relative to trolley arm 4 so that upon predetermined relative movement therebetween they thereafter move in unison.

Consequently, if the forward head becomes derailed, load bar 2 swings downwardly, carrying with it the arm 4 of the trailing trolley, about the axis of pivot pin 12 thereof. Upon predetermined swinging movement of the trolley arm 4 abuts one of the washers 17′ whereby upon continued movement in this direction the arm 4 will lift one spool 15 clear of the rail 15′, leaving only the other spool 15 thereon, as illustrated in Fig. 5, thereby providing an initial derailing action facilitating complete derailment of the trailing trolley head.

To complete the derailment, arm 4 is provided with corner gusset plates 24 on opposite sides thereof. Plates 24 extend across the corner between the main body of arm 4 and portion 5 thereof, thereby strengthening the same, and have an upper edge inclined upwardly from the latter to the former. Consequently, upon further swinging movement of load bar 2 and the trailing trolley 3, beyond the position thereof shown in Fig. 5, one gusset plate 24 will abut the undersurface of rail 15′ and cam the trolley laterally outwardly away therefrom as illustrated in Fig. 6, thereby completing derailment of the trailing trolley.

Thus, a trolley constructed in accord with this invention provides a two part derailing action. Upon derailment of one trolley the load bar 2 swings and causes the arm 4 of the other trolley to swing and abut a washer 17′ and lift one spool 15 clear of rail 15′, thereby partially derailing the same. Continued swinging of load bar 2, and attached trolley arm 4, causes a gusset plate 24 to abut rail 15′ and cam said other trolley completely free thereof. In this way, both trolleys are derailed and damage thereto, which otherwise might result as described above, is completely avoided.

As previously noted, the trolley of this invention is less likely to derail because of the two-spool design of the rail engaging portions thereof. The spool design embraces the rail 15′ and easily accommodates variations in rail structure and alinement, and the use of two spools, one on each side of pivot pin 12, greatly assists in holding the trolley carriage to the rail in use.

The trolley of this invention is adapted for both manual and power operation, and to this end a lug 18′ is welded or otherwise secured to pivot pin 12 to project upwardly therefrom. Lug 18′ is substantially in vertical alinement with rail 15′ and load bar 2 in use, and is adapted to receive power, as from a pusher bar carried by a drive chain or the like, and transmit it directly to arm 4 in by-pass relation to the spool carriage.

At the same time, all of this is provided in a relatively simple and extremely durable construction which is while being quite fabricated readily without requiring skilled labor and using relatively inexpensive materials.

Accordingly, the instant invention fully accomplishes the aforesaid objects. While only a presently preferred embodiment of the invention has been disclosed and discussed in detail herein, it will be appreciated that the same is susceptible of various modifications and variations, apparent to those skilled in the art, all without departing from the spirit of the invention and the scope of the appended claims.

Having fully disclosed my invention and described its mode of operation, what I claim as new is:

1. A conveyor trolley comprising, a carriage, an arm normally depending therefrom, pivot means connecting said carriage to said arm adjacent the upper end thereof for pivotal movement relative thereto about a normally generally horizontal first axis, a pair of wheels adapted to engage a conveyor rail journaled in said carriage on opposite sides of said first axis, a transverse flange part extending from said arm beneath said carriage, said flange part being adapted for pivotal attachment to a load member for movement relative thereto about a generally vertical second axis, gusset plate means extending across the juncture between said arm and said flange part, said gusset plate means having an upper surface inclining upwardly from said flange part to said arm and adapted to bear against the undersurface of an associated conveyor rail to cam said trolley outwardly therefrom upon predetermined upward movement of said trolley relative to such rail, and stop means carried by said carriage on opposite sides of said arm for abutting the latter to limt relative pivoting between said carriage and said arm, said top means being positioned so that upon pivoting of said arm in either direction about said first axis said stop means will cause said carriage to move therewith and lift one wheel off such rail before said gusset plate means cams said trolley away therefrom.

2. A conveyor trolley comprising, a carriage, an arm normally depending therefrom, pivot means connecting said carriage to said arm for movement relative thereto about a pivot axis substantially normal to said arm, a pair of wheels journaled in said carriage on opposite sides of the pivot means for engaging an associated conveyor rail, a flange part extending laterally with respect to said arm and below said carriage, said flange part being adapted for attachment to a load member, means connected to said arm and to said flange part, and having a surface thereon adapted to bear against the undersurface of an associated conveyor rail to cam said carriage away from the conveyor rail upon movement of said flange part toward said rail, and stop means on said carriage spaced from said pivot means, said stop means adapted to be engaged by said arm upon pivotal movement thereof to cause said carriage to move therewith and lift one of the wheels from the rail before the means between the arm and flange part engages the rail to cam the entire carriage from the rail.

References Cited in the file of this patent

UNITED STATES PATENTS

| | | |
|---|---|---|
| 476,600 | Benson | June 7, 1892 |
| 743,786 | White | Nov. 10, 1903 |
| 1,087,062 | Izett | Feb. 10, 1914 |
| 2,234,620 | Botley | Mar. 11, 1941 |
| 2,250,167 | Niles et al. | July 22, 1941 |
| 2,566,962 | Ramsey | Sept. 4, 1951 |
| 2,634,851 | Steinhoff | Apr. 14, 1953 |

FOREIGN PATENTS

| | | |
|---|---|---|
| 734,007 | France | July 19, 1932 |
| 314,191 | Switzerland | July 14, 1956 |

UNITED STATES PATENT OFFICE
CERTIFICATION OF CORRECTION

Patent No. 2,968,257                                 January 17, 1961

Kenneth D. Schreyer

It is hereby certified that error appears in the above numbered patent requiring correction and that the said Letters Patent should read as corrected below.

Column 1, line 33, for "aforsaid" read -- aforesaid --; column 4, line 69, for "limt" read -- limit --; line 70, for "top" read -- stop --.

Signed and sealed this 1st day of August 1961.

(SEAL)
Attest:

ERNEST W. SWIDER                                       DAVID L. LADD

Attesting Officer                                          Commissioner of Patents